United States Patent
Shi

(10) Patent No.: US 11,645,943 B2
(45) Date of Patent: May 9, 2023

(54) METHOD AND APPARATUS FOR TRAINING EMAIL RECIPIENTS AGAINST PHISHING ATTACKS USING REAL THREATS IN REALTIME

(71) Applicant: Barracuda Networks, Inc., Campbell, CA (US)

(72) Inventor: Fleming Shi, Scotts Valley, CA (US)

(73) Assignee: Barracuda Networks, Inc., Campbell, CA (US)

( * ) Notice: Subject to any disclaimer, the term of this patent is extended or adjusted under 35 U.S.C. 154(b) by 444 days.

(21) Appl. No.: 16/358,503

(22) Filed: Mar. 19, 2019

(65) Prior Publication Data

US 2019/0318653 A1 Oct. 17, 2019

Related U.S. Application Data

(60) Provisional application No. 62/752,263, filed on Oct. 29, 2018, provisional application No. 62/656,202, filed on Apr. 11, 2018.

(51) Int. Cl.
*H04L 9/40* (2022.01)
*G09B 19/00* (2006.01)

(52) U.S. Cl.
CPC ...... *G09B 19/0053* (2013.01); *H04L 63/1416* (2013.01); *H04L 63/1483* (2013.01)

(58) Field of Classification Search
CPC ............. H04L 63/1416; H04L 63/1483; H04L 63/1408; H04L 63/0227
See application file for complete search history.

(56) References Cited

U.S. PATENT DOCUMENTS

| | | | |
|---|---|---|---|
| 8,448,241 B1 * | 5/2013 | Kadakia | G06F 21/577 726/25 |
| 8,484,741 B1 | 7/2013 | Chapman | |
| 8,984,640 B1 * | 3/2015 | Emigh | G06F 21/50 726/13 |
| 9,224,117 B2 | 12/2015 | Chapman | |
| 9,635,052 B2 * | 4/2017 | Hadnagy | H04L 51/12 |
| 9,749,360 B1 * | 8/2017 | Irimie | H04L 63/1483 |
| 9,881,271 B2 | 1/2018 | Chapman | |
| 2005/0015626 A1 * | 1/2005 | Chasin | H04L 63/0245 726/4 |
| 2007/0136806 A1 * | 6/2007 | Berman | G06Q 10/107 726/22 |

(Continued)

*Primary Examiner* — William G Trost, IV
*Assistant Examiner* — Adam A Cooney

(57) ABSTRACT

An approach is proposed to support user-specific real time anti-phishing training of email recipients using real phishing attacks. When a recipient triggers an active content such as an URL link embedded in and/or opens an attachment to an email arrived at the recipient's account, the triggered active content is synchronously intercepted and examined in real time for potential malicious intent of a phishing attack. If the triggered active content is determined to be safe, the recipient is allowed to access the content. If the active content is determined to be malicious, the active content is blocked and the recipient is redirected a safe blocking mechanism. The recipient is then provided with an anti-phishing training exercise, which is specifically customized for the recipient based on the blocked active content in the payload of the email and/or the recipient's security posture and awareness.

25 Claims, 3 Drawing Sheets

(56) References Cited

U.S. PATENT DOCUMENTS

| | | | |
|---|---|---|---|
| 2012/0102545 A1* | 4/2012 | Carter, III | G06F 21/51 |
| | | | 707/769 |
| 2014/0199663 A1* | 7/2014 | Sadeh-Koniecpol | |
| | | | H04L 63/1458 |
| | | | 434/118 |
| 2014/0337995 A1* | 11/2014 | Fritzson | G06F 21/577 |
| | | | 726/26 |
| 2016/0269433 A1* | 9/2016 | Jiang | H04W 12/12 |
| 2017/0126729 A1 | 5/2017 | Oberheide | |
| 2017/0237753 A1* | 8/2017 | Manning Dawson | |
| | | | H04L 63/1416 |
| | | | 726/23 |
| 2018/0041537 A1 | 2/2018 | Bloxham et al. | |
| 2018/0115573 A1* | 4/2018 | Kuo | H04L 63/101 |
| 2018/0191754 A1 | 7/2018 | Higbee et al. | |
| 2018/0307844 A1 | 10/2018 | Kras et al. | |
| 2018/0324201 A1* | 11/2018 | Lowry | H04L 63/1483 |
| 2019/0034623 A1* | 1/2019 | Lowry | H04L 63/1483 |
| 2020/0092326 A1* | 3/2020 | Prakash | G06F 21/6263 |

\* cited by examiner

200

```
┌─────────────────────────────────────────────────────────────────────┐
│  Disassemble, isolate, and deactivate a malicious active content of an │
│  email once such malicious active content of an email has been identified │
│                                 202                                  │
└─────────────────────────────────────────────────────────────────────┘
                                   │
                                   ▼
┌─────────────────────────────────────────────────────────────────────┐
│   Replace the malicious active content in the email with training data, │
│  which is benign active content that is not harmful to the recipient even │
│                       when he or she accesses it                     │
│                                 204                                  │
└─────────────────────────────────────────────────────────────────────┘
                                   │
                                   ▼
┌─────────────────────────────────────────────────────────────────────┐
│  Reconstruct payload of the email with the replaced benign training data │
│   and delivered to the recipient in place of the original email for an anti- │
│                          phishing training exercise                  │
│                                 206                                  │
└─────────────────────────────────────────────────────────────────────┘
                                   │
                                   ▼
┌─────────────────────────────────────────────────────────────────────┐
│  Track and report usage and/or actions by the recipient with respect to the │
│  benign training data to the anti-phishing training engine 106 when the │
│              recipient accesses the benign training data             │
│                                 208                                  │
└─────────────────────────────────────────────────────────────────────┘
```

FIG. 2

METHOD AND APPARATUS FOR TRAINING EMAIL RECIPIENTS AGAINST PHISHING ATTACKS USING REAL THREATS IN REALTIME

CROSS-REFERENCE TO RELATED APPLICATIONS

This application claims the benefit of U.S. Provisional Patent Application No. 62/656,202, filed Apr. 11, 2018, and entitled "Method and apparatus for training humans against phishing attacks using real threats in realtime," which is incorporated herein in its entirety by reference.

This application claims the benefit of U.S. Provisional Patent Application No. 62/752,263, filed Oct. 29, 2018, and entitled "Method and apparatus for neutralizing real threats to training materials," which is incorporated herein in its entirety by reference.

This patent application is related to co-pending U.S. patent application Ser. No. 16/358,537, filed Mar. 19, 2019, and entitled "Method and apparatus for neutralizing real cyber threats to training materials," which is incorporated herein in its entirety by reference.

BACKGROUND

The massive expansion of Internet usage that has occurred since the mid-1990's has spawned a corresponding increase in cyber attacks, which may be broadly defined as any attack that involves a computer and a network (including particularly the Internet). Phishing attack is specific type of cyber attack that has been on the rise wherein the sender of an e-mail masquerades as a trustworthy sender in an attempt to deceive the receiver into providing personal identity data or other sensitive information including but not limited to account usernames, passwords, social security number or other identification information, financial account credentials (such as credit card numbers) or other information, etc. to the sender by a return e-mail or similar electronic communication.

A phishing attack usually begins when the attacker or "phisher" sends a spoofed phishing e-mail weaponized with malicious content including but not limited to one or more web URLs/links that lead the recipient of the phishing e-mail to one or more unsafe fake websites and/or attachments such as MS Office documents, PDF documents and other artifacts which could contain active malicious content. The phishing e-mail is an e-mail in which the sender's e-mail address and other parts of the e-mail header are altered to appear as though the e-mail originated from a different and well-known (and authentic) address. Since email systems based on SMTP do not provide any authentication, it is relatively simple for the phisher to conceal the actual origin of an e-mail message, and make the phishing e-mail appear to have come from an authentic and trustworthy sender. In some embodiments, the phishing e-mail is activated when the e-mail recipient opens the email and consumes the information in the email. For a non-limiting example, if the e-mail recipient clicks on a link to a fake website operated by the phisher, where the e-mail recipient may then be directed to enter confidential information at a fake website the look and feel of which may be virtually identical to a legitimate website. This confidential information may subsequently be used by the phisher to access the e-mail recipients' various accounts, including secured websites of the employer of the e-mail recipient, or to rob the e-mail recipient's financial accounts.

Current IT or cybersecurity tools are often incapable of preventing the phishing attacks, which leads the email recipients to rely on their conscious awareness and/or human behavior as the last layer of defense to save them from falling victim to the phishing attacks. Today, many organizations are seeking training of their employees in preparation for the phishing attacks from emails and other messaging platforms where active content such as links and files embedded or attached to the emails have been weaponized either by spoofing the original sender or target website. There have been tools to build sophisticated pre-defined/programmed training campaigns to train users/email recipients with training materials comprising fabricated phishing attacks, wherein these fabricated attacks are often based on historical phishing attacks happened in the past, which may not be aligned with the latest cyber threats evolving and happening in the real world in real time. In fact, most of the training material are artificially created and usually may be behind on the techniques used by the attackers. The efforts involved in creating such training material can also be tedious and resource intensive. In addition, not every user is susceptible to the same kind of phishing attacks that a pre-programmed campaign covers as the users' human behaviors, knowledge, experience, and awareness of the cyber attacks may vary. As a result, the users may still have to rely on their judgements and discretions as the last layer of defense when dealing with the phishing attacks happening in real world even after going through the training campaigns. It is thus desirable to be able to provide the users with customized, on-the-spot training against the phishing attacks happening in the real world in real time.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support neutralizing real threats to training materials in accordance with some embodiments.

DETAILED DESCRIPTION OF EMBODIMENTS

Figure 1:
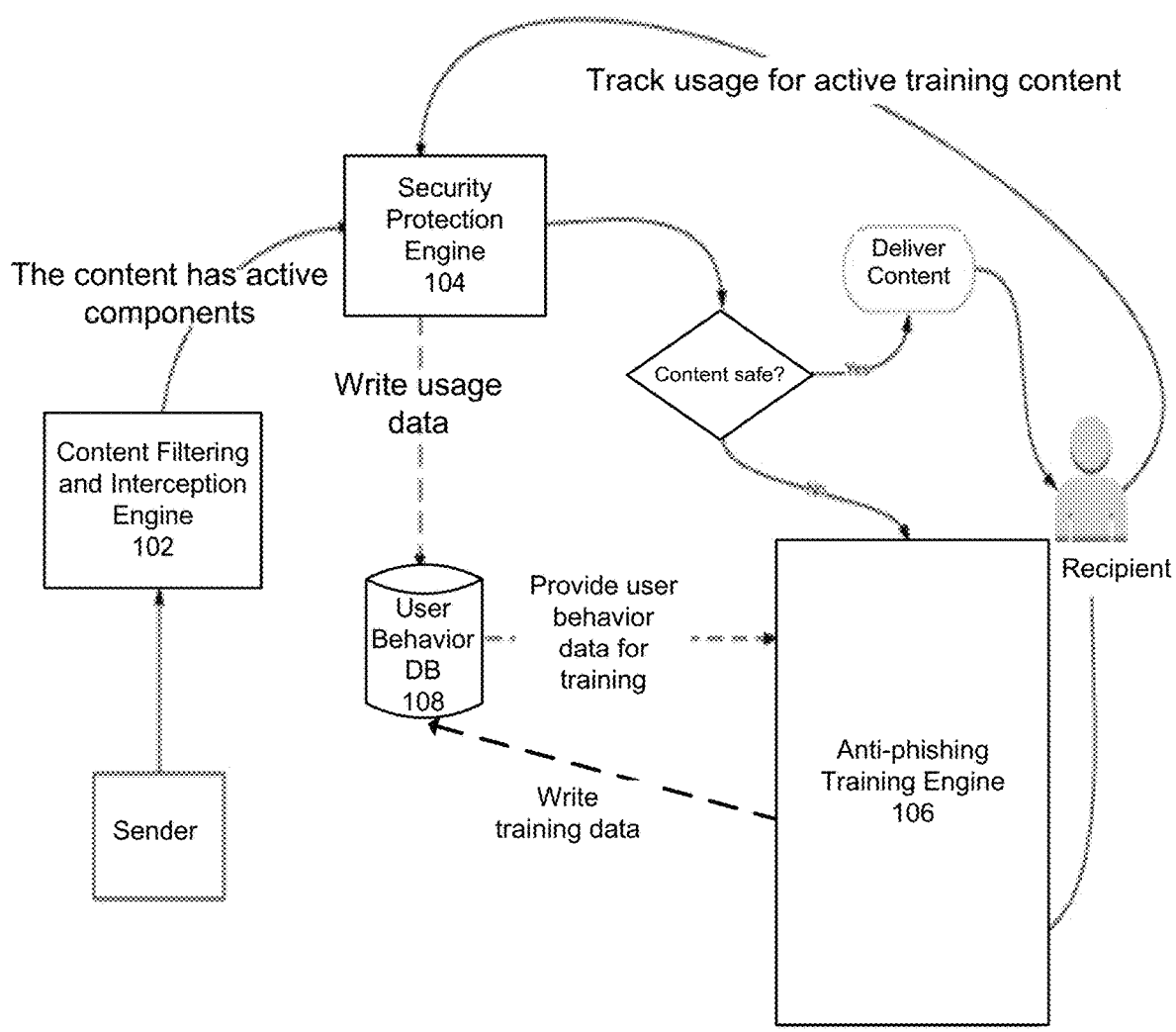
FIG. 1 depicts an example of a system diagram to support anti-phishing training using real attacks in real time in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support user-specific real time anti-phishing training of email recipients using real world phishing attacks by intercepting, modifying and redistributing active content(s) of an email arrived at the recipient's email account. Specifically, when a recipient triggers an active content of in a payload of the email by clicking on an URL link embedded in and/or opening an attachment to the email, the triggered active content of the email is intercepted and examined in real time for potential malicious intent of a phishing attack. If the triggered active content is determined to be safe for access by the recipient, the payload of the email is delivered to the recipient. If an active content such as an URL link that directs to a fake website and/or any attachment that contains malicious content is detected in the email, the URL link and/or the attachment is blocked while the recipient is then safely redirected a blocking mechanism alerting/warning the recipient of the attack. The malicious active content in the email is then disassembled and deactivated while the payload is reconstructed with links and markings for training purposes. The recipient is then provided with an anti-phishing training exercise, wherein content of the training exercise is specifically customized for the recipient based on the reconstructed payload of the received email and/or the recipient's security posture and awareness. Under the proposed approach, real phishing attacks received by a recipient, instead of artificial, pre-programmed training campaigns, are used in anti-phishing training exercises for the recipient by defusing and neutralizing attacker's "weapons"/malicious components into training materials. The derived training material also allows for proper tracking of the user's behavior during the training. As the phishing attacks become more sophisticated in the real world, such an approach provides the email recipients with more effective and real time training that are precise to the vulnerability or security knowledge gap of the recipients with possible remediation actions before they become victims of the phishing attacks. Such an approach also reduces the burden on network security and IT professionals as they no longer need to prepare for training campaigns based on historical attack data.

FIG. 1 depicts an example of a system diagram 100 to support anti-phishing training using real attacks in real time. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a content filtering and interception engine 102, a security protection engine 104, an anti-phishing training engine 106, and a user behavior database 108. Each of the engines and/or database runs on one or more computing units or hosts (not shown). Each of the hosts includes one or more processors with software instructions stored in a storage unit such as a non-volatile memory (also referred to as secondary memory) of the host for practicing one or more processes. When the software instructions are executed by the one or more processors of the host, at least a subset of the software instructions is loaded into a memory unit (also referred to as primary memory) by the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each host has a communication interface (not shown), which enables the engines to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, the content filtering and interception engine 102 is configured to intercept an email arriving at a user's email account within an entity or corporation along a data path via either a proxy or a relay mechanism prescribed to a governing communication protocol and to detect an active content/component of the email. Here, the communication protocol can be but is not limited to Simple Mail Transfer Protocol (SMTP) or Hyper Text Transfer Protocol (HTTP). The proxy or a relay mechanism can be but is not limited to a message transfer agent or a Web proxy depending on the communication protocol being used. The active content of the email can be but are not limited to one or more embedded URL links directing to a website or macros in one or more documents attached to the email.

When trying to consume such active content of the email, the recipient may trigger the active content by clicking on one of the URL links and/or opening one of the attached documents. When the active content is triggered, the security protection engine 104 depicted in the example of FIG. 1 is configured to examine the URL link being clicked and/or the document to be opened in real time for malicious content that may trigger a phishing attack before such content, e.g., the webpage of the URL link and/or the document, is presented to and consumed by the recipient. Here, the content filtering and interception engine 102 and/or the security protection engine 104 are positioned in a synchronous data path from which the URL link and/or the document is transferred and to be consumed by the recipient so that the URL link and/or the document would not be consumed by the recipient before they are examined. In some embodiments, in the case of the URL link, the security protection engine 104 is configured to determine if the URL link points to a fake website of an attacker. If it is determined that the active content is safe, e.g., URL link does not point to a fake website, the active content is delivered to the recipient and the recipient is allowed to visit the website or open the attachment. Otherwise, the security protection engine 104 is configured to protect the recipient by blocking the fake website pointed to by the URL link and redirecting the recipient to a safe blocking mechanism as discussed in detail below. In the case of the attached document, the security protection engine 104 is configured to determine if the attached document contains any malicious content, e.g., a computer virus. The recipient is allowed to open the document only if the document contains no malicious content. Otherwise, the security protection engine 104 is configured to protect the recipient by blocking access to the document and redirecting the recipient to the safe blocking mechanism.

In the example of FIG. 1, the user behavior database 108 is configured to store usage information of the system 100 by the user, and his/her pattern of behavior when faced with a cyber threat such as a phishing attack so that the anti-phishing training can be customized to fit his/her needs. In some embodiments, the security protection engine 104 is configured to identify, classify, and organize a catalog of types of cyber threats or phishing attacks against the user and store the catalog in the user behavior database 108. For non-limiting examples, the types of the phishing attacks include but are not limited to phishing scam on gambling, phishing scam on shopping, and phishing scam on brand hijacking. If a user/recipient is very well versed and his/her security posture with respect to the phishing attack is high already, then the anti-phishing training needs to be elevated. If, on the other hand, the user keeps on falling for the same type of attacks, then he/she may require more repetitive training at the current level. In some embodiments, the security protection engine 104 is configured to monitor and store information about the active content such as URL links and/or the documents the recipient attempted to access into the user behavior database 108. Such information is used to establish the pattern of behavior of the recipient when he/she faces a phishing attack. For a non-limiting example, the pattern of behavior of the recipient may demonstrate frequency of attempts by the recipient to access a malicious content, the specific type of phishing attacks the recipient is likely to fall victim to, and the severity of such phishing attacks. Such pattern of behavior of the recipient can then be used to customize an anti-phishing training exercise that is specific to the recipient's weaknesses and vulnerabilities with respect to the phishing attacks.

In some embodiments, the security protection engine 104 is configured to re-direct the recipient to a safe blocking mechanism designed to kick-in once the phishing attack is blocked and the recipient is prevented from falling victim to such attack by the security protection engine 104 as discussed above. In some embodiments, the blocking mechanism is a spoofed website/webpage that pretends to be another trusted site to the recipient. When the phishing attack is blocked, the webpage is configured to present to the recipient that the URL link and/or the attached document he/she is trying to access contains malicious content and his/her access to such malicious content has been blocked. In some embodiments, the security protection engine 104 is configured to determine that the recipients needs to go through an anti-phishing training exercise specific to his/her needs as discussed in details below and inform the recipient accordingly via the blocking mechanism according to his/her pattern of behavior to access to the malicious content, retrieved from the user behavior database 108 about, e.g., type and severity of the malicious content and the frequency of his/her attempted access to such content.

In the example of FIG. 1, the anti-phishing training engine 106 is configured to provide an anti-phishing training exercise/session to the recipient who has been the subject of a phishing attack and is determined by the security protection engine 104 to need additional anti-phishing training. In some embodiments, the anti-phishing training engine 106 is configured to access and retrieve the recipient's pattern of behavior of accessing malicious content in the past from the user behavior database 108 to determine the type of anti-phishing training exercise the recipient needs. In some embodiments, content of the training exercise is specifically customized for the recipient based on his/her current need for such training as well as the blocked real phishing attack content the recipient received in the email and tried to access, which is an indication of his/her vulnerability and lack of awareness for such phishing attack. For a non-limiting example, if a phishing attack via the email was based on "typo-squatting" phishing, e.g., "macy.com" was intentionally misspelled by the attacker as "rnacy.com" in an embedded URL link that leads to a spoofed Macy site, and the recipient clicked on the link, the anti-phishing training engine 106 is configured to train the recipient to examine this type of URL and to check the SSL certificate presented when a secure site is visited. In some embodiments, the anti-phishing training engine 106 is configured to interactively present the anti-phishing training exercise to the recipient via a user portal in formats that include but are not limited to audio, video, slide-show, even human interactions with the recipient in order to achieve the best outcome in training the recipient who almost fell for the specific type of phishing attack by the malicious content in the received email.

In some embodiments, the anti-phishing training engine 106 is configured to deactivate/defuse/de-weaponize/neutralize the malicious active content e.g., URL link directed to the fake website and/or the attached document in the email so that malicious content is no longer active and does not pose a security threat to the recipient even if he/she chooses to click on the link and/or open the document. Once malicious active content is neutralized, the anti-phishing training engine 106 is configured to turn such neutralized content into training materials representing up-to-date current cyber threat in the real world for an anti-phishing training exercise/session customized for the recipient. In some embodiments, the anti-phishing training engine 106 is configured to maintain the neutralized content into the user behavior database 108.

In some embodiments, the anti-phishing training engine 106 is configured to replace the malicious content, e.g., the fake URL link and/or the malicious document, in the email with the neutralized active content to reconstruct the email as training data. Here, the training data may include neutralized active links or active code that references to the anti-phishing training engine 106 and are not harmful to the recipient even when he or she clicks on it. In some embodiments, the anti-phishing training engine 106 is configured to import information related to the behavior of the user/recipient from the user behavior database 108 to personalize the reconstructed payload of the email prescriptively to tailor the training data specific to the recipient. The anti-phishing training engine 106 is then configured to allow the recipient to access, e.g., click or download, the neutralized active content when consuming the reconstructed email as part of the anti-phishing training exercise without prior alert or warning for the purpose of monitoring the recipient's behavior when facing a phishing attack. In some embodiments, the anti-phishing training engine 106 is configured to track and report back to the security protection engine 104 the behaviors of the recipient during the anti-phishing training exercise when the recipient accesses, e.g., clicks and/or downloads, the derived/neutralized active content in the training data. At this point, the security protection engine 104 knows the active content in the email has been reconstructed and is safe as training data for the recipient. In some embodiments, the anti-phishing training engine 106 is configured to save the behaviors of the recipient during the anti-phishing training exercise to the user behavior database 108.

FIG. 2 depicts a flowchart 200 of an example of a process to support neutralizing real threats to training materials. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a malicious active content of an email is disassembled, isolated, and deactivated once such malicious active content of an email has been identified. The flowchart 200 continues to block 204, where the malicious active content in the email is replaced with training data, which is benign active content that is not harmful to the recipient even when he or she accesses it. The flowchart 200 continues to block 206, wherein payload of the email is reconstructed with the replaced benign training data and delivered to the recipient in place of the original email for an anti-phishing training exercise. The flowchart 200 ends at block 208, wherein usage and/or actions by the recipient with respect to the benign training data is tracked and reported to the anti-phishing training engine 106 when the recipient accesses the benign training data.

In some embodiments, the anti-phishing training engine 106 is configured to customize the anti-phishing training exercise not only using the real phishing attack content the recipient received in the email and tried to access, but also based on the recipient's current security posture or awareness. Specifically, the anti-phishing training engine 106 is configured to automatically determine if the recipient needs to be retrained with the same anti-phishing training exercise, escalated to a different training exercise or reported to a higher authority, or be certified for completing the anti-phishing training based on the recipient's performance including but not limited to the recipient's behaviors, interactions, responses, during and/or after the anti-phishing training exercise. For non-limiting examples, as the recipient tries to improve his/her security posture and awareness against the phishing attack through the anti-training exercise, the anti-phishing training engine 106 is configured to provide the recipients with elevated training exercises for more advanced types of attacks if the recipient is already very well versed and his/her security posture against the current received attacks is sufficient. In some embodiments, the elevated training exercises can also be triggered by real phishing attacks received in emails the recipient receives. On the other hand, if the recipient keeps on falling for the same or similar types of phishing attack, the anti-phishing training engine 106 is configured to provide the recipients with repetitive training at the same level. In some embodiments, the anti-phishing training engine 106 is configured to record the current training status of the recipient, e.g., the recipient's current security posture and awareness and/or the recipient's training record in the training exercises into the user behavior database 108 for future training consideration of the recipient, e.g., whether the recipient needs repeated training and/or elevated training.

Figure 3:
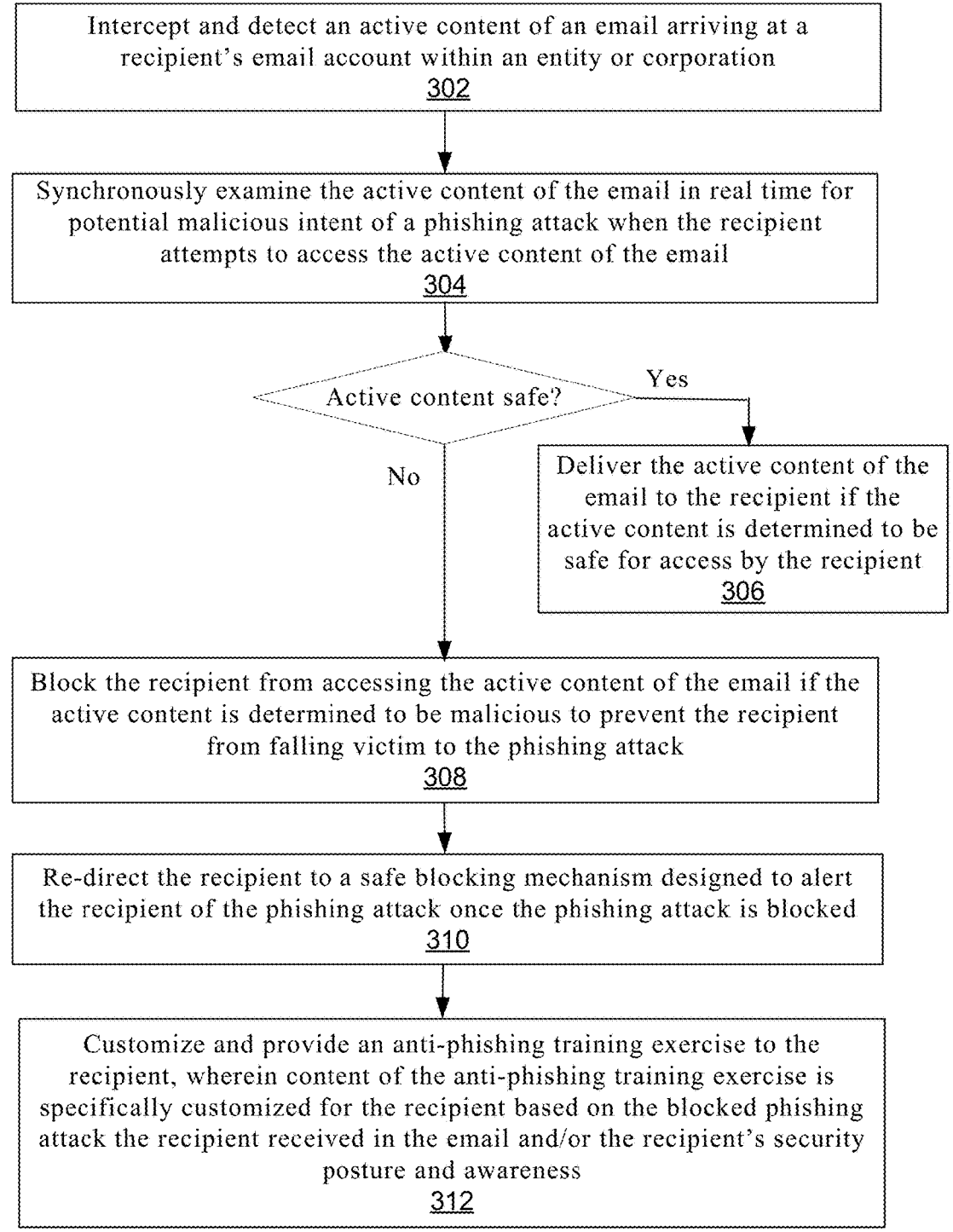
FIG. 3 depicts a flowchart of an example of a process to support anti-phishing training using real attacks in real time in accordance with some embodiments.

FIG. 3 depicts a flowchart 300 of an example of a process to support anti-phishing training using real attacks in real time. In the example of FIG. 3, the flowchart 300 starts at block 302, where an active content of an email arriving at a recipient's email account within an entity or corporation is intercepted and detected. The flowchart 300 continues to block 304, where the active content of the email is synchronously examined in real time for potential malicious intent of a phishing attack when the recipient attempts to access the active content of the email. The flowchart 300 continues to block 306, where the active content of the email is delivered to the recipient if the active content is determined to be safe for access by the recipient. The flowchart 300 continues to block 308, where the recipient is blocked from accessing the active content of the email if the active content is determined to be malicious to prevent the recipient from falling victim to the phishing attack. The flowchart 300 continues to block 310, where the recipient is re-directed to a safe blocking mechanism designed to alert the recipient of the phishing attack once the phishing attack is blocked. The flowchart 300 ends at block 312, where an anti-phishing training exercise is customized and provided to the recipient, wherein content of the anti-phishing training exercise is specifically customized for the recipient based on the blocked real phishing attack the recipient received in the email and/or the recipient's security posture and awareness.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for a non-limiting example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support anti-phishing training using real attacks in real time, comprising:
 a content filtering and interception engine positioned in a synchronous data path, wherein the content filtering and interception is running on a host that is different from a device associated with a recipient and configured to intercept and detect an active content of an email arriving at the recipient's email account within an entity or corporation, and wherein the content filtering and interception engine is further configured to intercept an active content of the email when the recipient attempts to access the active content of the email;

a security protection engine running on a host that is different from the device associated with the recipient, wherein the security protection engine is configured to receive the active content of the email from the content filtering and interception engine and is configured to examine the active content of the email in real time for potential malicious intent of a phishing attack;

deliver additional content associated with the active content of the email to the recipient if the active content is determined to be safe for access by the recipient;

block the recipient from accessing the additional content associated with the active content of the email if the active content is determined to be malicious to prevent the recipient from falling victim to the phishing attack;

re-direct the recipient to a safe blocking mechanism designed to alert the recipient of the phishing attack once the phishing attack is blocked;

an anti-phishing training engine running on a host that is different from the device associated with the recipient and configured to customize and provide an anti-phishing training exercise to the recipient in response to the recipient being blocked by the security protection engine from accessing the additional content associated with the active content, wherein content of the anti-phishing training exercise is specifically customized for the recipient based on the blocked phishing attack the recipient received in the email, wherein the security protection engine and the content filtering and interception engine are positioned on a data path between the recipient and a sender of the email.

2. The system of claim 1, wherein:
the content filtering and interception engine and the security protection engine are positioned in a data path from which the active content of the email is to be consumed by the recipient so that the active content of the email is intercepted and examined before it is consumed by the recipient.

3. The system of claim 1, wherein:
the content filtering and interception engine is configured to intercept the email via either a proxy or a relay mechanism prescribed to a governing communication protocol.

4. The system of claim 1, wherein:
the active content of the email is an embedded URL link directing to a website or macros in an attached document to the email.

5. The system of claim 4, wherein:
the security protection engine is configured to determine if the URL link points to a fake website of an attacker.

6. The system of claim 4, wherein:
the security protection engine is configured to determine if the attachment contains any malicious content.

7. The system of claim 1, wherein:
the security protection engine is configured to monitor and store information about the active content the recipient attempted to access into a user behavior database, wherein such information is used to establish a pattern of behavior of the recipient when the recipient faces a phishing attack.

8. The system of claim 7, wherein:
the pattern of behavior of the recipient includes one or more of frequency of attempts by the recipient to access a malicious content, types of phishing attacks the recipient is likely to fall victim to, and severity of such phishing attacks.

9. The system of claim 7, wherein:
the security protection engine is configured to determine the anti-phishing training exercise that the recipients needs to go through specific to his/her needs and inform the recipient according to his/her pattern of behavior to access to the malicious content.

10. The system of claim 9, wherein:
the anti-phishing training engine is configured to automatically determine if the recipient needs to be retrained with the same anti-phishing training exercise or elevated to a different training exercise based on the recipient's behaviors, interactions, responses, during and/or after the anti-phishing training exercise.

11. The system of claim 1, wherein:
the security protection engine is configured to re-direct the recipient to a safe blocking mechanism designed to kick-in once the phishing attack is blocked and the recipient is prevented from falling victim to such attack.

12. The system of claim 1, wherein:
the anti-phishing training engine is configured to access and retrieve the recipient's pattern of behavior of accessing malicious content in the past to determine the type of anti-phishing training exercise the recipient needs.

13. The system of claim 1, wherein:
the anti-phishing training engine is configured to interactively present the anti-phishing training exercise to the recipient via a user portal in formats that include one or more of audio, video, slide-show, and human interactions with the recipient.

14. The system of claim 1, wherein:
the anti-phishing training engine is configured to record the recipient's current security posture and awareness and/or the recipient's training record in the training exercise for future training consideration for the recipient.

15. A method to support anti-phishing training using real attacks in real time, comprising:
intercepting and detecting an active content of an email when a recipient of the email attempts to access the active content of the email, wherein the intercepting and the detecting is performed by a host positioned in a synchronous data path, wherein the host is different from a device associated with the recipient;

synchronously examining the active content of the email in real time for potential malicious intent of a phishing attack;

delivering additional content associated with the active content of the email to the recipient if the active content is determined to be safe for access by the recipient;

blocking the recipient from accessing the additional content associated with the active content of the email if the active content is determined to be malicious to prevent the recipient from falling victim to the phishing attack;

re-directing the recipient to a safe blocking mechanism designed to alert the recipient of the phishing attack once the phishing attack is blocked, wherein the intercepting and the detecting, the synchronously examining, the delivering, the blocking, and the re-directing is performed by one or more components positioned between the recipient and a sender of the email;

customizing and providing an anti-phishing training exercise to the recipient in response to the recipient being blocked from accessing the additional content associated with the active content, wherein content of the anti-phishing training exercise is specifically customized for the recipient based on the blocked phishing attack the recipient received in the email.

16. The method of claim 15, further comprising:
intercepting the email via either a proxy or a relay mechanism prescribed to a governing communication protocol.

17. The method of claim 15, further comprising:
determining if an URL link embedded in the email points to a fake web site of an attacker.

18. The method of claim 15, further comprising:
determining if an attachment to the email contains any malicious content.

19. The method of claim 15, further comprising:
monitoring and storing information about the active content the recipient attempted to access into a user behavior database, wherein such information is used to establish a pattern of behavior of the recipient when the recipient faces a phishing attack.

20. The method of claim 19, further comprising:
determining the anti-phishing training exercise that the recipients needs to go through specific to his/her needs and inform the recipient according to his/her pattern of behavior to access to the malicious content.

21. The method of claim 15, further comprising:
re-directing the recipient to a safe blocking mechanism designed to kick-in once the phishing attack is blocked and the recipient is prevented from falling victim to such attack.

22. The method of claim 15, further comprising:
accessing and retrieving the recipient's pattern of behavior of accessing malicious content in the past to determine the type of anti-phishing training exercise the recipient needs.

23. The method of claim 15, further comprising:
interactively presenting the anti-phishing training exercise to the recipient via a user portal in formats that include one or more of audio, video, slide-show, and human interactions with the recipient.

24. The method of claim 15, further comprising:
recording the recipient's current security posture and awareness and/or the recipient's training record in the training exercise for future training consideration for the recipient.

25. A non-transitory storage medium having software instructions stored thereon that when executed cause a system to:
intercept and detect an active content of an email when a recipient of the email attempts to access the active content of the email, wherein the intercepting and the detecting is performed by a host positioned in a synchronous data path, wherein the host is different from a device associated with the recipient;

synchronously examine the active content of the email in real time for potential malicious intent of a phishing attack;

deliver additional content associated with the active content of the email to the recipient if the active content is determined to be safe for access by the recipient;

block the recipient from accessing the additional content associated with the active content of the email if the active content is determined to be malicious to prevent the recipient from falling victim to the phishing attack;

re-direct the recipient to a safe blocking mechanism designed to alert the recipient of the phishing attack once the phishing attack is blocked, wherein the intercepting and the detecting, the synchronously examining, the delivering, the blocking, and the re-directing is performed by one or more components positioned between the recipient and a sender of the email;

customize and provide an anti-phishing training exercise to the recipient in response to the recipient being blocked from accessing the additional content associated with the active content, wherein content of the anti-phishing training exercise is specifically customized for the recipient based on the blocked phishing attack the recipient received in the email.

* * * * *